United States Patent
Takahashi et al.

(10) Patent No.: US 6,761,139 B2
(45) Date of Patent: Jul. 13, 2004

(54) VALVE TIMING CONTROL APPARATUS FOR AN INTERNAL COMBUSTION ENGINE

(75) Inventors: Tatsuhiko Takahashi, Hyogo (JP); Shiro Yonezawa, Tokyo (JP); Yasuyoshi Hori, Tokyo (JP); Hideki Hagari, Tokyo (JP); Akira Furuta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/425,937

(22) Filed: Apr. 30, 2003

(65) Prior Publication Data
US 2003/0226529 A1 Dec. 11, 2003

(30) Foreign Application Priority Data
May 2, 2002 (JP) ........................ 2002-130245

(51) Int. Cl.[7] ................................. F01L 1/34
(52) U.S. Cl. ................ 123/90.15; 123/90.17; 123/90.27
(58) Field of Search ............. 123/90.15, 90.16, 123/90.17, 90.18, 90.27, 90.31, 406.18, 406.2, 406.58, 406.61, 406.63, 406.65

(56) References Cited

U.S. PATENT DOCUMENTS 5,245,968 A * 9/1993 Kolias et al. ............... 123/480
5,630,396 A * 5/1997 Fukui et al. ........... 123/406.18

FOREIGN PATENT DOCUMENTS

JP 6-159105 A 6/1994

* cited by examiner

Primary Examiner—Thomas Denion
Assistant Examiner—Ching Chang
(74) Attorney, Agent, or Firm—Sughrue Mion, PLLC

(57) ABSTRACT

An actuator for changing a relative position of at least an intake or exhaust camshaft, and a crank shaft; a cylinder identifying unit for performing cylinder identification in accordance with results detected by a crank angle sensor and a cam angle sensor; a valve timing detecting unit for detecting valve timing in accordance with the results detected by the crank angle sensor and the cam angle sensor; and an OCV for controlling the actuator based on a value detected by the valve timing detecting unit are provided. Control is performed at a neutral point by a valve timing controlling unit when the cylinder identification by the cylinder identifying unit is in an indefinite state.

6 Claims, 7 Drawing Sheets

VALVE TIMING CONTROL APPARATUS FOR AN INTERNAL COMBUSTION ENGINE

BACKGROUND OF THE INVENTION

1. Field of the Invention

The present invention relates to a valve timing control apparatus for an internal combustion engine.

2. Description of the Related Art

A valve timing control apparatus disclosed in JP 6-159105 A is an example of a conventional valve timing control apparatus. This is a device in which a control amount of a predetermined operating state of an oil pressure regulating valve as one valve timing changing means, is learned, and then a drive signal is corrected in accordance with the learned control amount.

The structure of the conventional valve timing control apparatus discussed in JP 6-159105 A is shown in FIG. 7. In the figure, reference numeral 701 denotes a relative rotation angle detecting means, reference numeral 702 denotes a target relative rotation angle calculating means, reference numeral 703 denotes a controlling means, reference numeral 704 denotes a learning means, reference numeral 705 denotes a driving means, and reference numeral 706 denotes a valve timing regulating means.

An operation thereof will be explained. The relative rotational angle between crank angle and cam angle, that is the valve timing, is detected in the relative rotation angle detecting means 701. The target relative rotation angle corresponding to an engine operation state is calculated in the target relative rotation angle calculating means 702. A control amount for performing feedback control by the variation between the target relative rotational angle and the detected relative rotational angle is calculated by the controlling means 703. The control amount is calculated in which a feedback control is performed in accordance with a deviation between the target relative rotational angle and the detected relative rotational angle by the controlling means 703. The learning means 704 learns the control amount in a holding state of the controlling means 703, in which the deviation between the target relative rotational angle and the detected relative rotational angle falls within a predetermined range. The controlling means 703 calculates a control amount, based on the value learned by the learning means 704, during control amount calculation. The driving means 705 drives the valve timing regulating means 706 in accordance with the control amount calculated by the controlling means 703.

The feedback control is thus performed by using the deviation between the target relative rotational angle and the detected relative rotational angle in the conventional valve timing control apparatus. Further, the control amount in a state in which the target relative rotational angle and the detected relative rotational angle are nearly identical is learned, and the control amount is calculated based on the learn value. A variation in components such as oil pressure regulating valves is therefore compensated for, and controllability is ensured. However, compensation is not performed with respect to detection defects in the crank angle and the cam angle due to superposition of noises, detection slippage, and the like in a crank angle sensor and a cam angle sensor. Problems thus exist in that cylinder identification irregularities develop, and this invites shocks, increased exhaust gas, and the like.

SUMMARY OF THE INVENTION

The present invention has been made in order to resolve these problems, and an object of the present invention is to obtain a valve timing control apparatus for an internal combustion engine which controls valve timing and prevents shocks and increased exhaust gas, even for cases in which cylinder identification irregularities develop.

According to the present invention, there is provided a valve timing control apparatus for an internal combustion engine, including: a crank angle detecting means for detecting a crank angle; a cam angle detecting means for detecting a cam angle; a valve timing changing means for changing a relative position of a cam shaft and a crank shaft at least for an intake or an exhaust; a cylinder identifying means for performing cylinder identification based on detected results by the crank angle detecting means and the cam angle detecting means; a valve timing detecting means for detecting valve timing based on the detected results by the crank angle detecting means and the cam angle detecting means; and a valve timing controlling means for controlling the valve timing changing means based on a value detected by the valve timing detecting means, in which the valve timing controlling means performs control at a neutral point when cylinder identification by the cylinder identifying means is in an indefinite state.

DETAILED DESCRIPTION OF THE PREFERRED EMBODIMENTS

Embodiment 1

Figure 1:
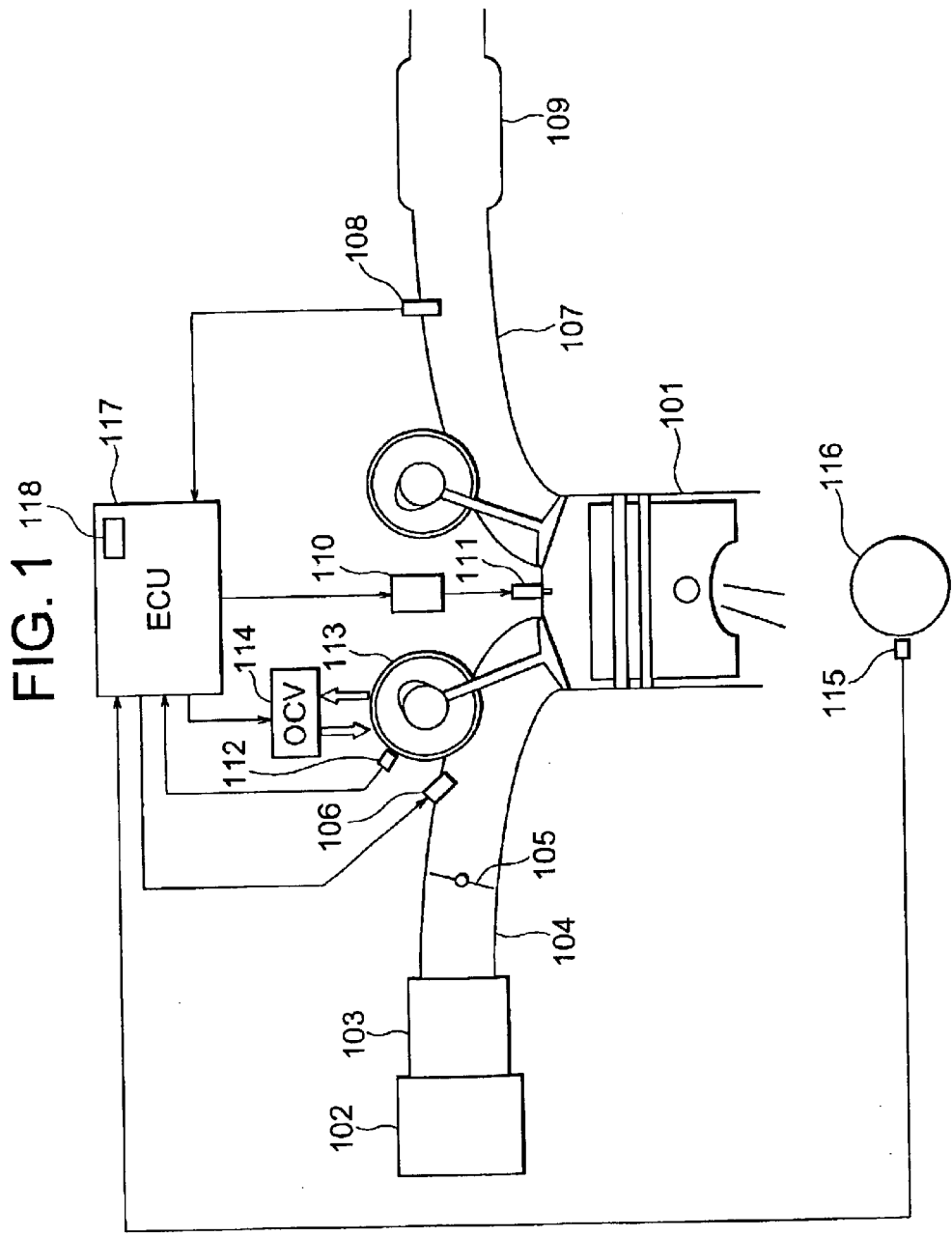
FIG. 1 is a structural diagram showing a valve timing control apparatus of the present invention and its peripheral structure.

FIG. 1 is a diagram showing a valve timing control apparatus relating to Embodiment 1 of the present invention, and the structure of the periphery of an internal combustion engine, a control object of the valve timing control apparatus. Reference numeral 101 in the figure denotes an internal combustion engine, reference numeral 102 denotes an air cleaner for cleaning air taken in by the internal combustion engine 101, and reference numeral 103 denotes an air flow sensor for measuring the amount of air taken in by the internal combustion engine 101. Reference numeral 104 denotes an intake pipe, reference numeral 105 denotes a throttle valve for regulating the amount of air taken in and controlling the output of the internal combustion engine 101, and reference numeral 106 denotes an injector for supplying fuel corresponding to the amount of air taken in. Reference numeral 111 denotes a spark plug in which sparks are generated for combusting a gas mixture within a combustion chamber of the internal combustion engine 101, reference numeral 110 denotes a spark coil for supplying high voltage energy to the spark plug 111, and reference numeral 107 denotes an exhaust pipe for exhausting combustion exhaust gases, reference numeral 108 denotes an O2 sensor for detecting the amount of oxygen remaining within the exhaust gas, and reference numeral 109 denotes a three way catalyst capable of simultaneously cleaning THC, CO, and NOx, which are noxious gasses within the exhaust gasses. Reference numeral 116 denotes a sensor plate for detecting a crank angle. A protrusion (note shown in the figure) is formed in a predetermined position on the sensor plate 116, which is attached to a crank shaft and rotates as a single unit with the crank shaft. Reference numeral 115 denotes a crank angle sensor for detecting the position of the crank shaft. A signal is generated when the protrusion (not shown in the figure) of the sensor plate 116 crosses the crank angle sensor 115, thus detecting the crank angle. Reference numeral 113 denotes an actuator (valve timing changing means) capable of relatively changing the phase of a cam angle with respect to the crank angle. Reference numeral 112 denotes a cam angle sensor for detecting the cam angle, in which a pulse signal is generated by a protrusion, similar to that of the crank angle sensor and not shown in the figure, on a sensor plate for detecting the cam angle. Reference numeral 114 denotes an oil control valve (hereafter referred to as OCV), which controls the cam phase by switching oil pressure to the actuator (valve timing changing device) used to change the cam phase. Reference numeral 117 denotes an ECU, which performs control of the cam phase (valve timing controlling means) by controlling the actuator (valve timing changing means) 113, along with performing control of the internal combustion engine 101. Reference numeral 118 denotes a memory which stores processing results and the like (for example, cylinder identification results, discussed later) in the ECU 117.

A pair of cam shafts are driven by a timing chain (not shown in the figure) for transmitting power from the crank shaft, through a pair of sprockets (not shown in the figure), in the internal combustion engine 101. The actuator (valve timing changing device) 113 is provided on the cam shaft.

Figure 2:
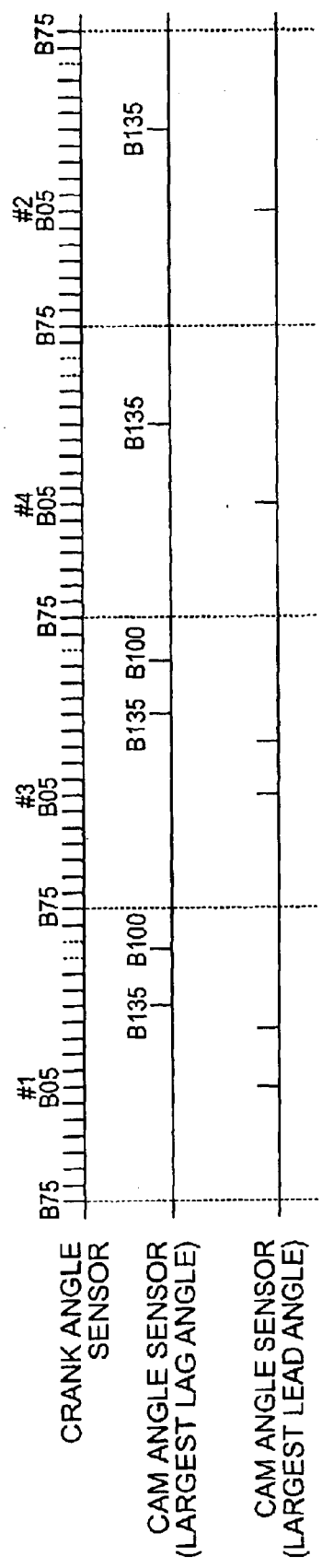
FIG. 2 is an explanatory diagram showing signal modes for a crank angle sensor and a cam angle sensor of the valve timing control apparatus of the present invention.

FIG. 2 is a diagram showing signal modes for the crank angle sensor 115 and the cam angle sensor 112. An example of four cylinders aligned in series is shown. Protrusions (or grooves) for detection by the crank angle sensor 115 are formed every 10 [deg CA] in the sensor plate 116, and there is a portion in which one protrusion (or groove) is missing (one missing tooth) and a portion in which two protrusions (or grooves) are missing (two missing teeth). The portion having one missing protrusion becomes a location at which a signal gap is 20 [deg CA], and the portion having two missing protrusions becomes a location at which the signal gap is 30 [deg CA] (refer to portions shown by dashed lines in the crank angle sensor signal shapes of FIG. 2).

Further, protrusions are also formed in the sensor plate (not shown in the figure) detected by the cam angle sensor 112, and signals are generated at each predetermined timing as shown in FIG. 2. The sensor plate (not shown in the figure) detected by the cam angle sensor 112 is attached in a position at which the phase angle with respect to the crank angle changes due to the actuator 113, which is the valve timing changing means. The cam angle sensor signal is one pulse (B135) or two pulses (B135 and B100) between 75 [deg CA] before the previous top dead center (B75) and 75 [deg CA] before the current top dead center (B75), that is, a cylinder determination interval of the crank angle sensor (hereinafter, the cam angle sensor signal at 135 [deg CA] before the top dead center in a lag angle state of the valve timing control (185 [deg CA] before the top dead center at the time of a lead angle with the valve timing movable range of 50 [deg CA] is referred to as a B135 signal, and the cam angle sensor signal at 100 [deg CA] before the top dead center in the lag angle state of the valve timing control (150 [deg CA] before the top dead center at the time of the lead angle with the valve timing movable range of 50 [degCA]) is referred to as a B100 signal.).

The signal changes between the positions from the cam angle sensor signal (lag angle) to the cam angle sensor signal (lead angle) in FIG. 2, and the valve timing is detected by the relationship of the output position between the crank angle sensor 115 and the cam angle sensor 112.

A method of cylinder identification is explained next. Note that the ECU 117 constitutes a cylinder identifying means for performing cylinder identification. Cylinder identification timing is 75 [deg CA] before the top dead center (B75), and cylinder identification is performed by using the number of missing teeth (one missing tooth or two missing teeth) and the number of cam angle sensor signals (one pulse or two pulses) between 75 [deg CA] before the previous top dead center (B75) and 75 [deg CA] before the current top dead center (B75) Specifically:

(1) a third cylinder when the number of missing teeth from the crank angle sensor is two, and the number of cam angle sensor signals is two;
(2) a fourth cylinder when the number of missing teeth from the crank angle sensor is one, and the number of cam angle sensor signals is two;
(3) a second cylinder when the number of missing teeth from the crank angle sensor is two, and the number of cam angle sensor signals is one; and
(4) a first cylinder when the number of missing teeth from the crank angle sensor is one, and the number of cam angle sensor signals is one.

The identified cylinder shows a cylinder in which there is additional advancement from the 75 [deg CA] before the top dead center (B75), which is the cylinder identification timing, and in which 5 [deg CA] before the next top dead center (B05) becomes 5 [deg CA] before a compression top dead center. The cylinder identifying means (the ECU 117) thus performs cylinder identification at each predetermined timing based on the detection results of the crank angle sensor and the cam angle sensor, and the cylinder identification by the cylinder identifying means is a cylinder identification result at each predetermined timing. Further, the cylinder identification results at each predetermined timing are stored as a learned series in the memory (storing means) 118 formed in the ECU 117.

A method of forming the learned series is explained next. Note that the ECU 117 is structured by a learned series forming means which forms the learned series. The learned series is formed for cases in which the cylinder identification in accordance with the number of missing teeth from the crank angle sensor 115 and the number of signals of the cam angle sensor 112, is correct for a predetermined number of strokes (for example, four strokes), and is stored in the memory 118. If the number of missing teeth from the crank angle sensor is two and the number of cam shaft signal is two, at an initial cylinder identification timing (B75), then the number of missing teeth from the crank angle sensor must be one, and the number of cam angle sensor signals must be two, at the next cylinder identification timing (B75).

Cylinder identification becomes OK provided that the number of missing teeth from the crank angle sensor and the number of cam angle sensor signals, which are actually detected, coincide with the number of missing teeth from the crank angle sensor and the number of cam angle sensor signals, which must be obtained at the next cylinder identification timing (B75). Cylinder identification is NG (in an indefinite state) if the values do not coincide.

The learned series is formed during the predetermined number of strokes (for example, four strokes), and stored in the memory 118, provided that the detected and necessary number of missing teeth from the crank angle sensor and the detected and necessary number of cam angle sensor signals match. Even if a disparity develops in the number of missing teeth from the crank angle sensor, and the number of cam angle sensor signals, between the cylinder identification and the learned series due to a cam angle sensor irregularity, for example, it becomes possible for the internal combustion engine to continue to operate by performing fuel injection and ignition control in accordance with the learned series stored in the memory 118, and it becomes possible to limp home.

A method of valve timing detection is explained next. Note that the ECU 117 is structured by a valve timing detecting means for detecting valve timing. Measurement of the time from the cam angle sensor B135 signal to 75 [deg CA] before the top dead center of the crank angle sensor (B75) at the cylinder identification timing (B75) is performed, and the valve timing from 75 [deg CA] before the previous top dead center (B75) of the crank angle sensor to 75 [deg CA] before the current top dead center (B75) of the crank angle sensor is measured.

$$\text{Valve timing} = \frac{\text{Crank angle sensor } (B75) \text{ time} - \text{Cam angle sensor } (B135) \text{ time}}{\text{Crank angle sensor } (B75) \text{ time} - \text{Previous Crank angle sensor } (B75) \text{ time}} \times 180[\deg CA] \qquad [\text{Eq. 1}]$$

Regarding the cam angle sensor signal, output timing changes due to the valve timing, and provided that the valve timing control apparatus is one capable of changing the valve timing by 50 [deg CA], the signal 135 [deg CA] before the top dead center (B135) changes from 135 [deg CA] before the top dead center (B135) (position of largest lag angle) to 185 [deg CA] before the top dead center (B185) (position of largest lead angle).

The valve timing therefore can be detected by the difference in the period between the crank angle sensor and the cam angle sensor. The valve timing is controlled with the valve timing in the largest lag angle state taken as a standard (zero), and with the amount of change from the largest lag angle state taken as the valve timing (lead angle amount).

A method of valve timing control is explained next. Note that the ECU 117 and the OCV 114 constitute a valve timing controlling means. An optimal valve timing exists for the running state of an internal combustion engine. For example, a target valve timing set in advance from a two dimensional map of rotational velocity and filling efficiency is referred to as a map for the rotational velocity and filling efficiency of a certain point in time. Feedback control is performed so as to eliminate the difference between the reference target valve timing and the aforementioned detected valve timing (lead angle amount). Feedback control is, for example, proportional plus derivative (PD) control in accordance with the deviation between the target valve timing and the detected valve timing (lead angle amount).

The OCV 114 makes changes in the oil route to the actuator 113, and to the amount of oil. Oil passage and oil amount control is performed by controlling the amount of electric current flowing. The amount of electric current is controlled between 0 and 1 [A], and the valve timing at a level of 0.5 [A] becomes a holding state in which there is no operation to the lead angle side or to the lag angle side (holding current). The valve timing operates to the lag angle side for electric current values smaller than the holding current, and the valve timing operates to the lead angle side for electric current values larger than the holding current. Valve timing operation does not occur to the lead angle side or to the lag angle side at the holding current, and the valve timing at that point in time is maintained (that is, this becomes neutral point control). The holding current changes due to dispersion in oil pressure in OCV 114 and the internal combustion engine, variations over time, and the like. Valve timing controllability due to dispersion and variations over time is compensated for by learning the value of the electric current in the control in a holding state and taking this value as the holding current.

The holding current value is output to the OCV 114 for cases in which the target valve timing and the detected valve timing (lead angle amount) are in agreement. If there is a difference between the target valve timing and the detected valve timing (lead angle amount), then the value of the electric current calculated from the deviation between the target valve timing and the detected valve timing (lead angle amount) is added to the value of the holding current, the detected valve timing (lead angle amount) is made to act, and control is performed so as to track the target valve timing. The value calculated by the deviation becomes positive for cases in which the target valve timing is more to the lead angle side, and becomes negative if the target valve timing is more to the lag angle side than the detected valve timing (lead angle amount). Control of the electric current to increase or decrease can be performed by taking the holding current value as a standard and by adding to the holding current.

A method of learning the value of the holding current is explained. If there is a difference between the holding current value and the value of electric current at the time when the target valve timing and the detected valve timing (lead angle amount) coincide, then the target valve timing and the detected valve timing (lead angle amount) cannot be made to agree in the proportional plus derivative (PD) control. During the proportional plus derivative (PD) controls the value of the electric current for the portion of the deviation between the target valve timing and the detected valve timing (lead angle amount), at the time when the detected valve timing (lead angle amount) stops tracking the target valve timing (where the detected valve timing (lead angle amount) stops changing), will be either insufficient or in excess. Therefore, provided that this value is added to the holding current value, then an electric current value at which the target valve timing and the detected valve timing (lead angle amount) coincide is obtained, and this value is then learned as the holding current value.

Figure 3:
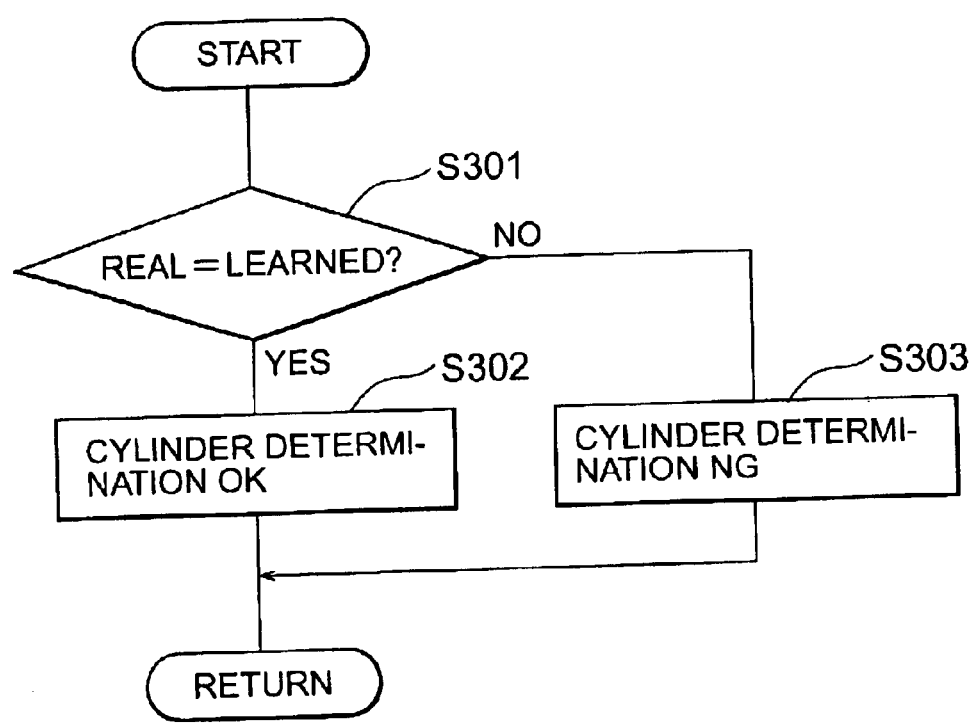
FIG. 3 is a flow chart showing error determination operations for cylinder identification in accordance with Embodiment 1 of the present invention.

FIG. 3 is a diagram showing a method of determining whether cylinder determination after the formation of the learned series is correct. At step S301, a cylinder identified by the number of missing teeth from the crank angle sensor and the number of cam angle sensor signals (real) and a cylinder of the learned series that has been formed (learned) are compared. Cylinder determination is judged to be correct (OK) at step S302 if the two are in agreement, but cylinder determination is judged to be incorrect (NG) at step S303 if the two cylinders do not match.

Figure 4:
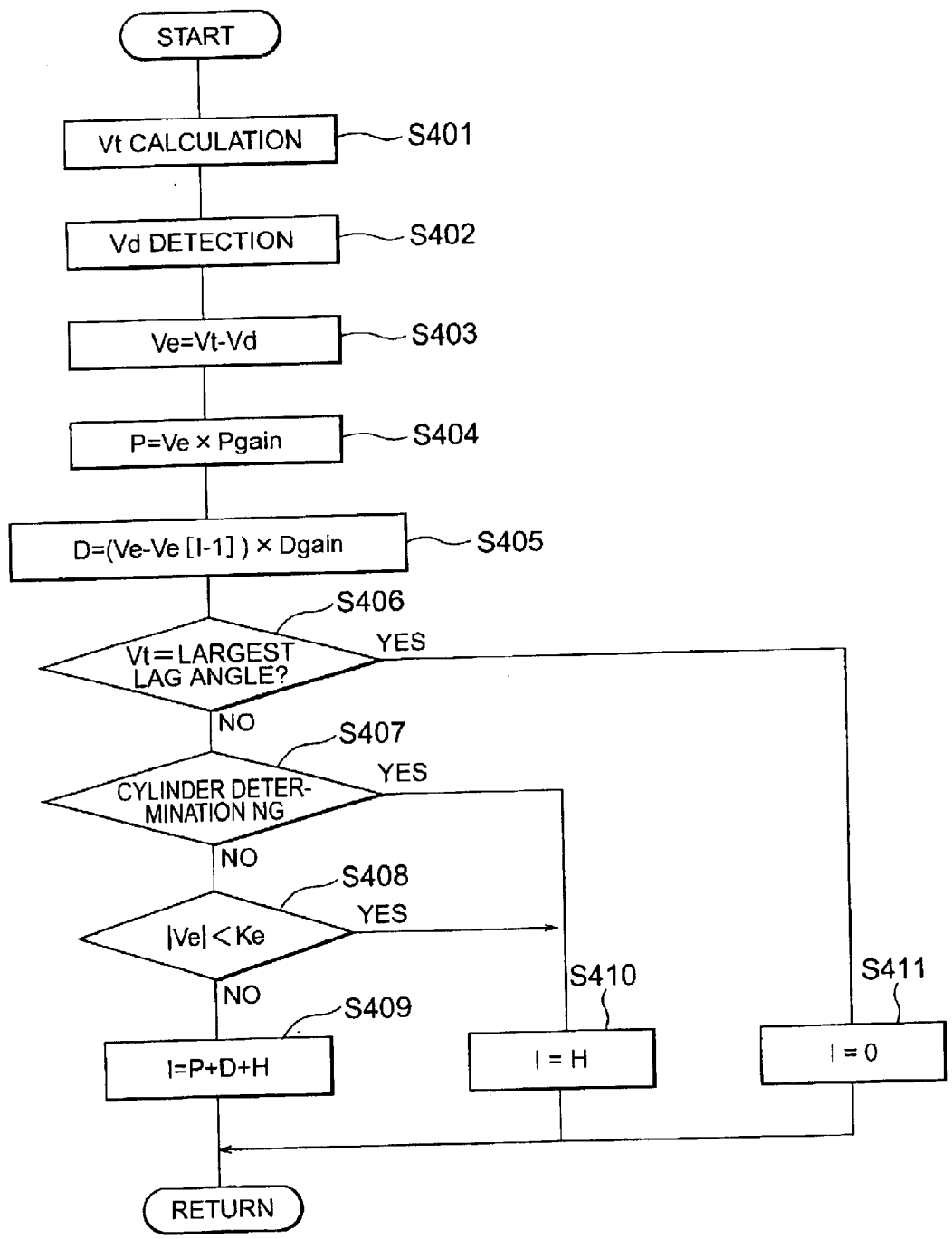
FIG. 4 is a flow chart showing valve timing control operations in accordance with Embodiment 1 of the present invention.

FIG. 4 is a flow chart showing the process of valve timing (lead angle amount) control. Valve timing (lead angle) control is performed every 75 [deg CA] before the top dead center (B75), which is the cylinder identification timing. A target valve timing (Vt) is calculated in step S401 from the movement state within the internal combustion engine. A detected valve timing (lead angle amount) (Vd) is detected in step S402 by the crank angle sensor and the cam angle sensor. A deviation amount (Ve) is found by subtracting the detected valve timing (lead angle amount) (Vd) from the target valve timing (Vt) in step S403. A proportional gain (Pgain) is multiplied with the deviation amount (Ve) in step S404. A derivative value (D) is calculated in step S405 by multiplying the difference between the deviation amount (Ve) and the previous deviation amount (Ve[i−1]), and a derivative gain (Dgain). Determination of whether the target valve timing is the largest lag angle is made in step S406. If the target valve timing is the largest lag angle, then a control current value (I) is set to zero in step S411 for controlling the position of the largest lag angle. If the target valve timing is not the largest lag angle, then determination is made as to whether or not the cylinder determination results of FIG. 3 are incorrect in step S407. If the cylinder determination results are correct (yes), then the control current value (I) is set as a holding current value (H) in step S410 (control by the valve timing control means is implemented as neutral point control). If the cylinder determination results are incorrect (no), then a determination is made as to whether or not the absolute value of the deviation amount (|Ve|) is smaller than a predetermined amount (Ke) (for example, 1 [deg CA]) in step S408, and if small, the control current value (I) is set as the holding current value (H) in step 410. If the absolute value of the deviation amount is determined to be larger than the predetermined amount, then the control current value (I) is set as the sum of a proportional value (P), the derivative value (D) and the holding current value (H) in step S409. The value of the electric current sent to the OCV 114 is thus controlled by duty control so as to become the control current value (I). Note that control at the holding current value (that is, control at the neutral point) is performed for cases in which the cylinder identification is incorrect in Embodiment 1. However, control based on the holding current value is not performed during control based on the minimum or maximum control amount.

Thus for cases in which cylinder identification (real) based on the crank angle sensor and the cam angle sensor does not coincide with the learned series, learned based on the cylinder identification performed by the crank angle sensor and the cam angle sensor, cylinder determination is taken as incorrect and valve timing control is taken as holding control, with the control current value set as the holding current value in Embodiment 1. Therefore, for example, the internal combustion engine continues performing fuel injection and ignition control by the learned series, even if the B100 signal of the cam angle sensor is detected shifting by one pulse and cylinder determination is found to be incorrect. For cases in which the target valve timing and the detected valve timing (lead angle value) coincide and control is performed at the holding current value, the valve timing will not fluctuate, and the generation of shocks, increased exhaust gas, and the like can be prevented from occurring by continuing to perform control at the holding current value, even if the cylinder determination is incorrect. Further, during the proportional plus derivative (PD) control in which the detected valve timing is made to track the target valve timing, the value temporarily becomes the holding current value. Therefore there is a slight worsening in the tracking response characteristics of the detected valve timing with the target valve timing, but it becomes possible to minimize the generation of shocks and the deterioration of the exhaust gasses without large fluctuations.

Embodiment 2

Figure 5:
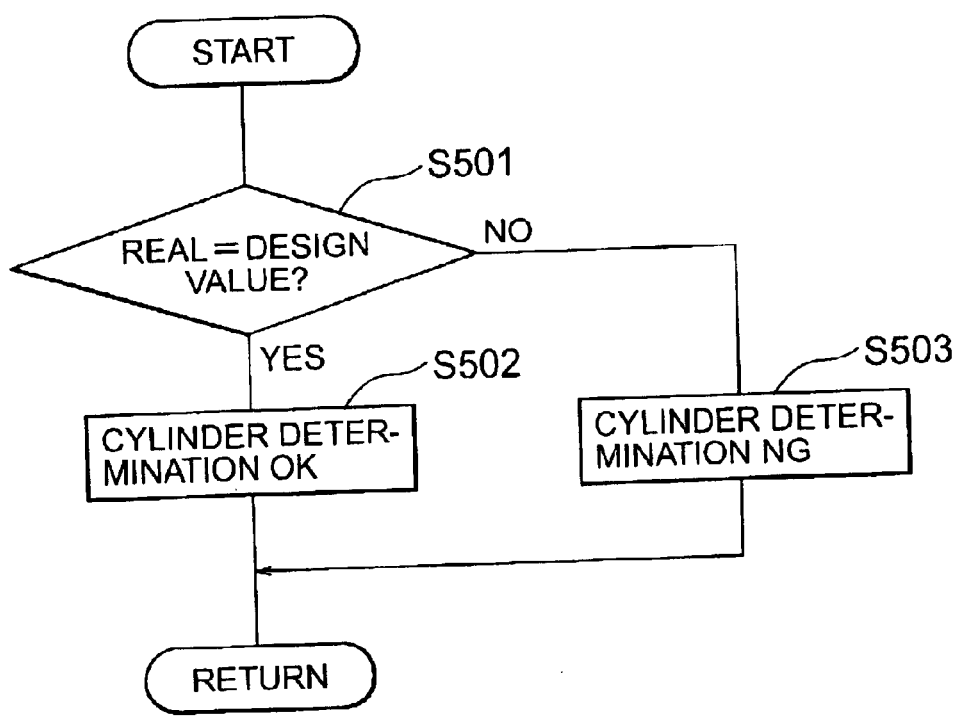
FIG. 5 is a flow chart showing error determination operations for cylinder determination in Embodiment 2 of the present invention.

FIG. 5 is a diagram showing another example of a method of judging whether or not cylinder determination is correct, and is a substitute for FIG. 3 of Embodiment 1. That is, in Embodiment 2, only the method of judging whether or not cylinder determination is correct differs from that in Embodiment 1 discussed above, and other structures and operations are similar to those of Embodiment 1. An explanation of the other structures and operations is therefore omitted here.

A comparison is made in step S501 between cylinder identification results (real) in accordance with the number of missing teeth from the crank angle sensor 115 and the number of cam angle sensor 112 signals, and design values, as shown in FIG. 5. The term design values refers to the ignition order of the internal combustion engine 101 determined in advance (for example, an order of cylinders 1, 3, 4, and 2). That is, judgement is made as to whether or not the cylinders determined in accordance with the number of missing teeth from the crank angle sensor 115 and the number of cam angle sensor 112 signals are in the order determined in advance. Cylinder determination is judged correct (OK) in step S502 if it follows the predetermined order. Cylinder determination is judged incorrect (NG) in step S503 if it does not follow the predetermined order. Valve timing control judgement in step S407 of FIG. 4 is implemented in accordance with the cylinder determination results being correct or incorrect in FIG. 5.

The results of cylinder identification performed by the output of the crank angle sensor 115 and the cam angle sensor 112 are thus compared with the design value in Embodiment 2, and cylinder determination is taken as being correct for cases in which the results of comparison are judged to show coincidence, that is the identical cylinder, and valve timing control continues to be performed thereafter. Effects similar to those of Embodiment 1 are thus obtained. Further, Embodiment 2 can also be applied to a state in which the learned series is not generated.

Embodiment 3

Figure 6:
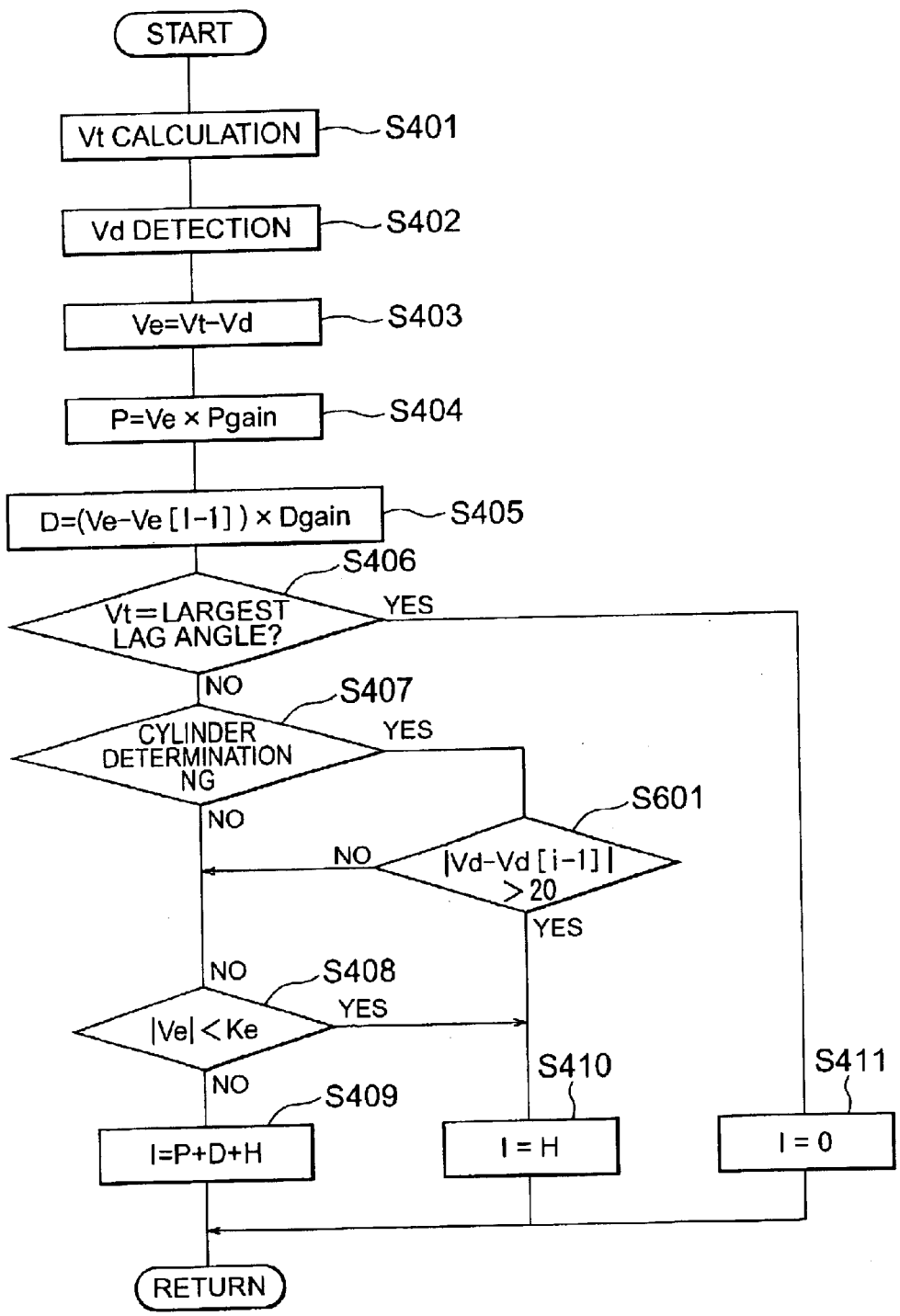
FIG. 6 is a flow chart showing valve timing control operations in accordance with Embodiment 3 of the present invention.
Figure 7:
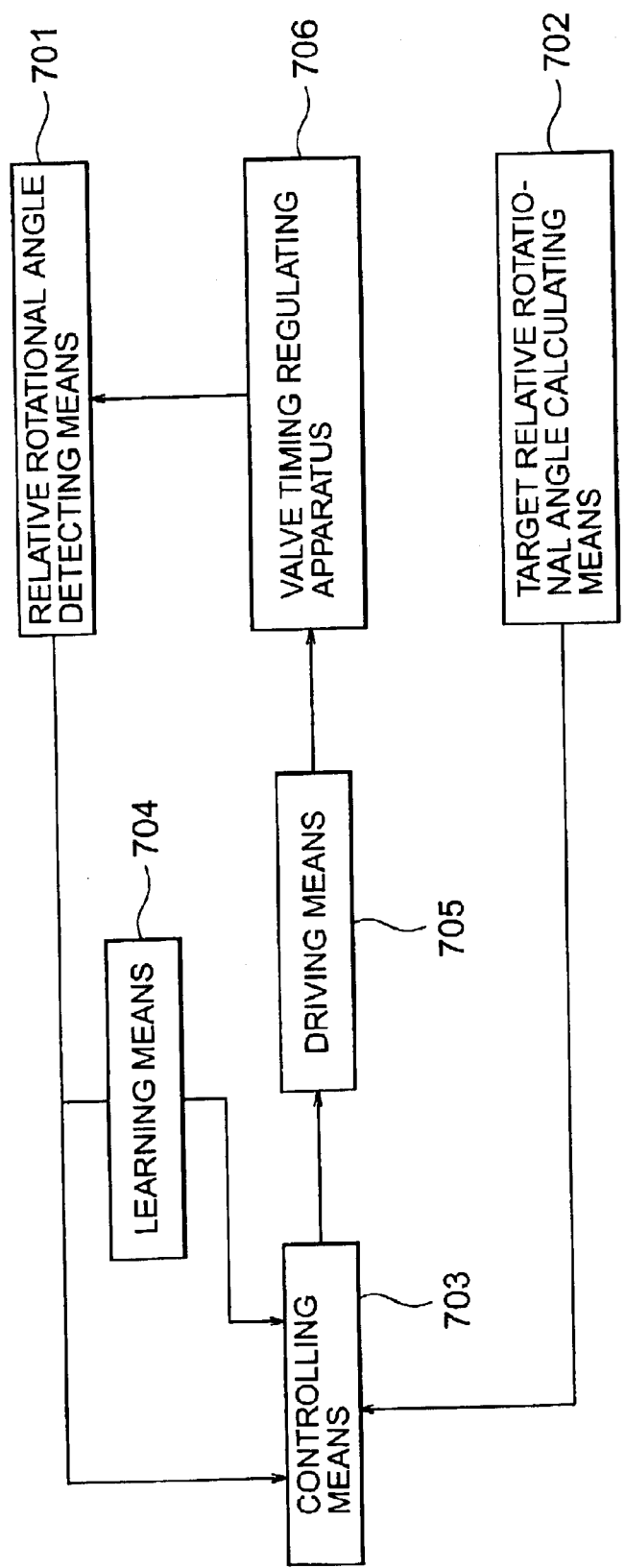
FIG. 7 is a structural diagram showing a structure of a conventional valve timing control apparatus.

FIG. 6 is a flow chart showing the process of valve timing control, and is a substitute for FIG. 4 of Embodiment 1. That is, only a portion of the valve timing control method in Embodiment 3 differs from that of Embodiment 1, and other structures and operations are similar to those of Embodiment 1. An explanation of the other structures and operations is therefore omitted here. Note that processes having reference numerals that are identical to those of FIG. 4 of Embodiment 1 are identical processes, and therefore an explanation of those processes is omitted.

If the cylinder determination is incorrect in step S407 in FIG. 6, then the judgment is made in step S601 as to whether the absolute value of the value obtained by subtracting the previous detected valve timing (lead angle amount) (Vd[I−1]) from the detected valve timing (lead angle amount) (Vd) is larger than a predetermined value (for example, 20 [deg CA]). If the judgment is that the value is not larger (No), then the same processes as those implemented when the cylinder determination in step S407 is correct (OK) are performed, that is normal valve timing control is performed.

For cases in which a signal 100 [deg CA] before the top dead center (B100) of the cam angle sensor 112 cannot be detected, the cylinder determination becomes incorrect (NG). The detected valve timing (lead angle amount) uses a signal 135 [deg CA] before the top dead center (B135) of the cam angle sensor 112, and therefore detection can be performed correctly. The valve timing can therefore be controlled correctly, and it thus becomes possible to perform normal valve timing control even if the cylinder identification is incorrect (NG).

For cases in which the signal 135 [deg CA] before the top dead center (B135) of the cam angle sensor 112 cannot be detected, the detected valve timing becomes the signal 100 [deg CA] before the top dead center (B100). In this case, the difference between the previous (one stoke prior) detected valve timing and the current detected valve timing becomes 35 [deg CA]. The operating speed of the actuator 113, which is the valve timing changing means, is at maximum on the order of 10 [deg CA] per single step, and therefore it can be judged that the signal 135 [deg CA] before the top dead center (B135) of the cam angle sensor 112 cannot be detected if there is a change greater than 20 [deg CA].

Normal valve timing control is thus performed for cases in which the valve timing is detected normally, even if the cylinder determination is incorrect (NG). For cases in which the cylinder determination is incorrect (NG) and the valve timing cannot be detected, the generation of shocks and the deterioration of the exhaust gasses due to valve timing fluctuations can be prevented by performing neutral point control.

What is claimed is:

1. A valve timing control apparatus for an internal combustion engine comprising:

crank angle detecting means for detecting a crank angle;
   cam angle detecting means for detecting a cam angle;
   valve timing changing means for changing a relative position of a cam shaft and a crank shaft at least for an intake or an exhaust;
   cylinder identifying means for performing cylinder identification based on detected results by the crank angle detecting means and the cam angle detecting means;
   valve timing detecting means for detecting valve timing based on the detected results by the crank angle detecting means and the cam angle detecting means; and
   valve timing controlling means for controlling the valve timing changing means based on a value detected by the valve timing detecting means,
   wherein the valve timing controlling means performs control at a neutral point when cylinder identification by the cylinder identifying means is in an indefinite state.

2. A valve timing control apparatus for an internal combustion engine according to claim 1, wherein the control at the neutral point is implemented at times other than when control of the valve timing changing means is being controlled in a predetermined minimum or maximum control amount, and when the cylinder identification is in an indefinite state.

3. A valve timing control apparatus for an internal combustion engine according to claim 1, wherein the cylinder identifying means performs cylinder identification at each predetermined timing based on the detected results by the crank angle detecting means and the cam angle detecting means.

4. A valve timing control apparatus for an internal combustion engine according to claim 3, further comprising storing means for storing the cylinder identification results at each predetermined timing as a learned series, wherein the indefinite state of the cylinder identification is a state in which the cylinder identification results at each predetermined timing are not consistent with the learned series stored in the storing means.

5. A valve timing control apparatus for an internal combustion engine according to claim 3, wherein the indefinite state of the cylinder identification is a state in which the cylinder identification results at each predetermined timing are not consistent with design values for a combustion order of cylinders in the internal combustion engine.

6. A valve timing control apparatus for an internal combustion engine according to claim 1, wherein the implementation of the control at the neutral point is performed in a state in which valve timing detection by using the crank angle detecting means and the cam angle detecting means is impossible and the cylinder identification is in an indefinite state.

* * * * *